Jan. 10, 1950   W. A. THOMAS   2,494,070
APPARATUS FOR BURNING PULVERIZED FUEL
Filed Sept. 10, 1945   2 Sheets-Sheet 1
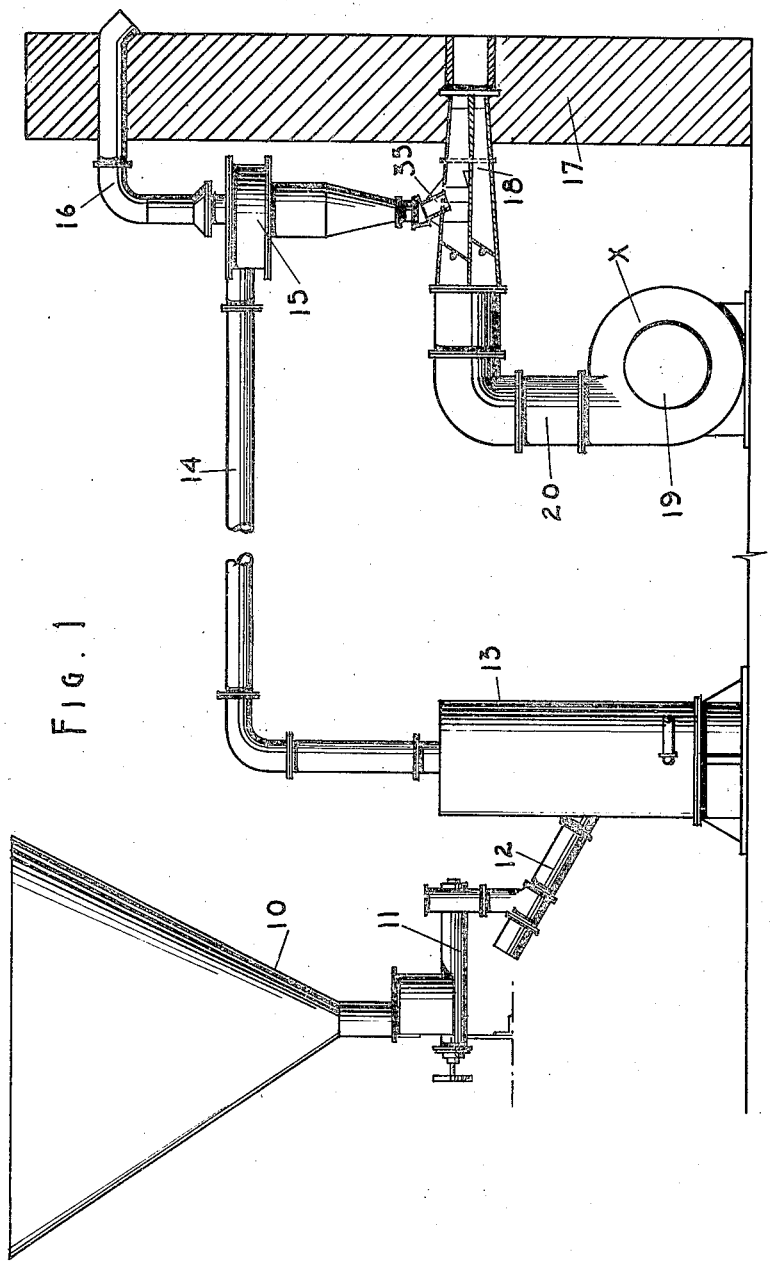
INVENTOR
WILLIAM A. THOMAS

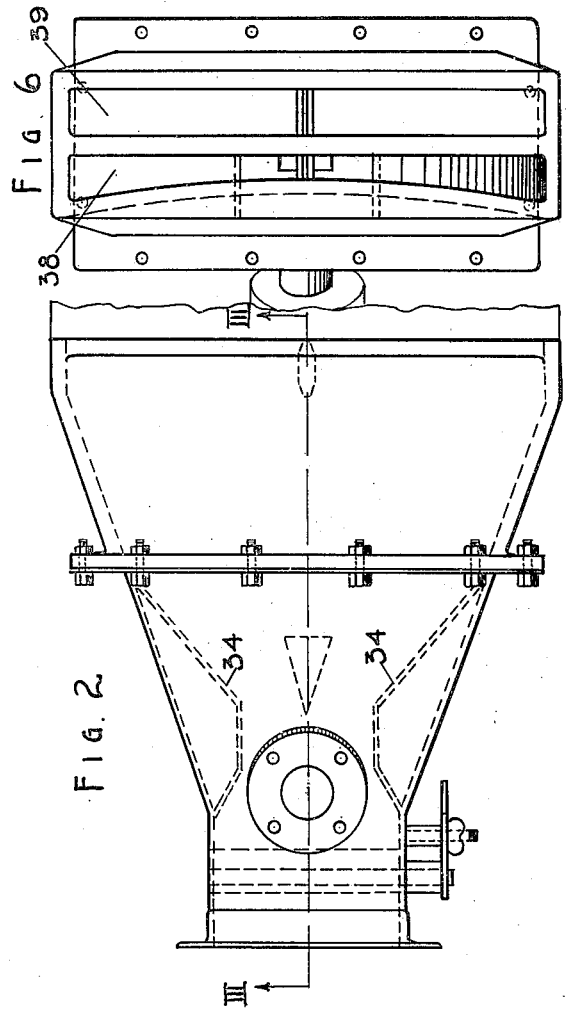
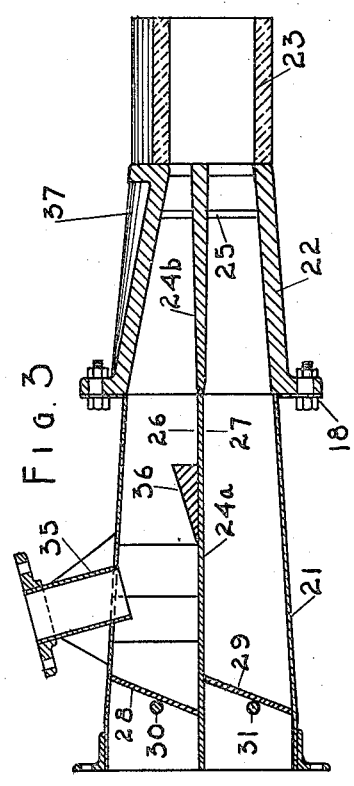
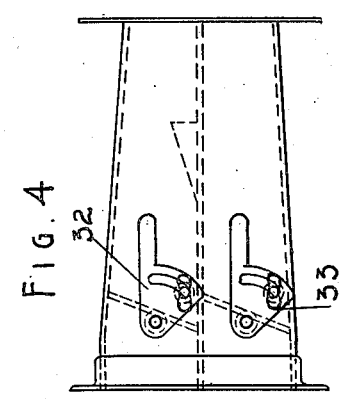

Patented Jan. 10, 1950

2,494,070

UNITED STATES PATENT OFFICE 2,494,070

APPARATUS FOR BURNING PULVERIZED FUEL

William A. Thomas, Oakmont, Pa., assignor to Blaw-Knox Company, Pittsburgh, Pa., a corporation of New Jersey Application September 10, 1945, Serial No. 615,312

6 Claims. (Cl. 110—104)

This invention relates to the combustion of solid fuel in pulverized form and, in particular, to a burner and method of combustion suitable for use in a system for burning pulverized coal, such as described and claimed in Hammond Patent 2,358,508.

Burners used heretofore for the combustion of pulverized fuel, such as coal, have been characterized by a relatively long flame. As a result, if the combustion space is of ordinary dimensions, the walls are subject to excessive erosion by the flame. If the combustion space is made large enough to avoid such excessive erosion, the furnace capacity is reduced to a relatively low figure, such as 17,000 B. t. u.'s per cubic foot. I have invented a novel burner and method for the combustion of pulverized fuel which produce a relatively short flame of small volume so that, when projected into a combustion space of ordinary dimensions, the walls thereof are not subject to excessive erosion, while, at the same time, the furnace capacity is in the neighborhood of 30,000 or 35,000 B. t. u.'s per cubic foot. This requires completion of combustion as near as possible to the entrance to the combustion space and not merely the control of the velocity and distribution of the entering combustible mixture. My invention also has other important advantages which will be specifically enumerated hereinafter.

In a preferred practice of the invention, I discharge into the combustion space a rich mixture of fuel and air, in the form of a flat stream having a width many times its depth. I supply secondary air below the air fuel stream, also in the form of a wide flat stream having a width many times its depth. The fuel particles become ignited close to the entrance to the combustion space and, as they burn, fall through the layer of secondary air which itself tends to rise on being subjected to the heat within the furnace. The fuel and air thus have intimate contact and complete and efficient combustion results in a short time.

The burner which I prefer to employ for carrying out the method outlined above comprises a nozzle or elongated box generally rectangular in section, including an entrance section, an intermediate or distributing section and a terminal mouth or mixing section in which ignition occurs. The entrance and distributing sections have side walls flaring forwardly and top and bottom walls which converge forwardly. A horizontal partition or wall divides the two sections into separate passages. A fuel inlet communicates with the upper passage. The top of the upper passage is downwardly bowed transversely thereof adjacent its forward end. The distributing section thus delivers an upper stream of fuel and air to the mixing section and a lower stream of secondary air. The outlets from the distributing section have a width several times their depth and the depth of the upper outlet is smaller at the middle than at the sides. The mixing section is simply a hollow tile conforming to the shape of the distributing section at its outlet end.

For a complete understanding of the invention, reference is made to the accompanying drawings illustrating a preferred embodiment of the apparatus. In the drawings, Figure 1 is a diagrammatic elevation with the burner in vertical section;

Figure 2 is a plan view of the burner with a portion broken away;

Figure 3 is a longitudinal section through a burner taken along the plane of line III—III of Figure 2;

Figure 4 is a side elevation of the entrance section;

Figure 5 is an end elevation of the entrance section;

Figure 6 is an end elevation of the distributing section.

Referring in detail to the drawings, Figure 1 shows diagrammatically a system for the preparation and supply of pulverized fuel generally similar to that shown in the aforementioned Hammond application. Fuel of suitable size, such as coal, contained in a hopper 10 is delivered by a feeder, such as a screw conveyor 11, to means, such as an injector 12, for discharge into an impact pulverizer 13. The pulverizer may be of the general type shown in Kidwell et al. Patent 2,219,011. Preferably, however, it is similar to the pulverizer disclosed and claimed in my copending application, Serial No. 637,820, filed December 29, 1945, for Impact pulverizer. The device 13, whatever its structural details, effects a circulation of the coal delivered thereto, as by suitably located steam jets, in such manner that it is pulverized by impact between the lumps.

From the pulverizer 13 the pulverized coal suspended in steam flows through a conduit 14 to a concentrator 15. The steam is expanded almost to atmospheric pressure in the concentrator and the coal falls downwardly therethrough. The steam flows through a conduit 16 and is discharged into the combustion space of a furnace, one of whose walls is indicated at 17.

The lower end of the concentrator 15 communicates with a burner indicated generally at 18 set into the wall 17. Air is supplied to the outer end of the burner 18 by a blower 19 through a conduit 20.

The burner 18, as illustrated in detail in Figures 2 through 6, comprises an entrance or aspirating section 21, a distributing section 22 and a terminal mouth or mixing section 23. The several sections have generally rectangular cross sections. The entrance section 21 may conveniently be fabricated from sheet metal. The distributing section 22 may be a casting and the mixing section is preferably a hollow tile of refractory material. The sides of the entrance section and distributing section diverge forwardly while their tops and bottoms converge forwardly. The mixing section is of substantially uniform sectional dimensions throughout and conforms in shape to the forward end of the distributing section 22.

A partition or horizontal wall 24a is disposed substantially equidistant from the top and bottom of the entrance section. A similar wall or partition 24b is provided in the distributing section 22. Ribs 25 extend from the wall 24b to the top and bottom of the distributing section. The walls 24a and 24b divide the entrance and distributing section into upper and lower passages 26 and 27.

Dampers 28 and 29 are located in the upper end and lower passages, respectively, being mounted on shafts 30 and 31 extending through opposite side walls of the section adjacent its entrance end. The shafts are provided with quadrants 32 and 33 whereby the dampers may be manually adjusted to control the division of air from the blower 19 between the passages 26 and 27.

The side walls of the passage 26 are constricted in the entrance section to provide a Venturi throat. This may conveniently be done by filler plates 34 extending between the wall 24a and the top of the entrance section. The plates 34 are bent, as shown in Figure 2, to leave a portion adjacent the median transverse plane which has a width smaller than that of the passage at either end of the entrance section. A neck 35 depending from the lower end of the concentrator 15 communicates with the upper passage 26 adjacent the Venturi throat afforded by the walls 34. In accordance with known principles, air flowing through the passage 26 suffers a reduction of pressure at the Venturi throat which is effective to induce fuel through the neck 35 into the air stream. A pyramidal baffle 36 is located on the partition 24a a short distance forwardly of the neck 35 with its apex extending rearwardly. The baffle thus has the effect of deflecting the entering air and fuel toward the sides of the entrance and distributing sections of the burner.

The top of the distributing section 22 is downwardly bowed transversely thereof as indicated at 37. As shown in Figure 6, the outlet of the upper passage indicated at 38 has a width several times its depth and has a depth at the center which is considerably less than at the sides. This has the effect of laterally spreading the stream of air and fuel flowing therefrom. The outlet 39 of the lower passage also has a width several times its depth and accordingly discharges a shallow flat stream or jet of secondary air below the similarly shaped stream of mixed fuel and air emerging from the outlet 38.

The mixing section 23 where ignition of the fuel occurs is simply a hollow refractory tile whose sectional shape corresponds to that of the distributing section at its discharge end.

It will be apparent from the foregoing that the burner delivers to the combustion space a relatively shallow flat layer or blanket of air rich in pulverized fuel. Below the fuel-air layer a wide shallow layer or blanket of secondary air is introduced. The secondary air tends to rise and the fuel to fall after reaching the ignition point. This countercurrent flow affords intimate contact of the fuel and air whereby complete combustion is effected very quickly. The flame projecting from the burner is thus shorter and smaller in volume than the flame characteristic of pulverized coal burners known heretofore. In addition, the amount of excess air needed to insure complete combustion is less than required heretofore.

It will be evident that mixture of the secondary air with the primary air and fuel begins in the mixing section 23. The ignition point is also located in this section, if the fuel is of a fineness such as to pass a screen of 200 mesh, or finer. The fuel may easily be ground to this fineness by an impact grinder without requiring excessive amounts of steam.

In addition to producing a short, compact flame of high heat capacity, the burner of my invention has an improved efficiency and may be used with advantage in large or small combustion spaces. It exhibits good turn-down characteristics, uniform ignition at the burner mouth, a wide lateral spread of the flame and is easily controlled. The Venturi throat in the upper passage of the entrance section of the burner insures uniform flow of pulverized fuel into the primary air stream. The delivery of steam from the concentrator through the conduit 16 is a further contribution to efficiency since the small amount of fuel inevitably entrained with the steam is thereby available for combustion. The fuel delivered to the burner is in the form of a cloud-like dispersion of fine particles in a relatively small amount of steam but the amount of steam is so small that objectionable agglomeration of particles as a result of condensation does not occur even if the air supplied by the blower 19 is at atmospheric temperature.

While the advantages of my invention may be most fully realized if the fuel is ground as finely as indicated above, a substantial reduction in the flame length and an acceleration of combustion will be obtained if the fuel is ground only as fine as has heretofore been the practice in burning pulverized coal.

Although I have illustrated and described but a preferred embodiment and practice of the invention, it will be recognized that changes in the construction and procedure disclosed may be made without departing from the spirit of the invention or the scope of the appended claims.

I claim:

1. Apparatus for burning pulverized fuel comprising a nozzle of generally rectangular section, the sides of the nozzle diverging forwardly and the top and bottom converging forwardly, a horizontal partition intermediate the top and bottom providing an upper passage for fuel and air and a lower passage for secondary air, the sides of the upper passage being constricted intermediate the ends of the nozzle, the lower surface of the top of the nozzle being bowed downwardly transversely thereof, adjacent the discharge end, means for supplying air to said passages, said air having a greater pressure than the pressure at the outlet end of said nozzle, and a fuel inlet adjacent the constriction in the upper passage whereby fuel is aspirated by said air passing the constriction in said upper passage.

2. A burner for the wall of a furnace heated by the combustion of pulverized fuel, comprising in combination, walls defining an upper passage having a width many times greater than its depth, walls defining a lower passage having a width many times greater than its depth, said upper passage having means for admitting fuel and air thereto and being adapted to supply a mixture of such fuel and air, said lower passage having means for admitting air thereto and being adapted to supply such air sufficient to complete the combustion of said fuel, said passages further having their side walls flaring in the direction of said furnace and the top wall of said upper passage and the bottom wall of said lower passage converging and being adapted to have their forward ends in superposed juxtaposition, said top wall of said upper passage being bowed downwardly transversely of said upper passage, whereby lateral distribution of said fuel in said upper passage is effected and said fuel and air passing through said passages intermix and burn with a relatively short intense flame immediately adjacent the wall of said furnace through which said burner passes.

3. A burner for a furnace heated by the combustion of pulverized fuel, comprising in combination, walls defining an entrance section and a distributing section in longitudinal registry with each other, a substantially horizontal partition dividing said entrance and distributing sections into upper and lower passages respectively, said upper and lower passages being many times wider than the depth thereof, said upper passage having means for admitting fuel and air thereto and said lower passage having means for admitting air thereto and adapted respectively to have such fuel and air moved therethrough to effect complete combustion immediately adjacent the forward ends of said passages, said distributing section having its side walls flaring toward said forward end and its top wall and bottom wall converging toward said forward end, said top wall being downwardly bowed transversely between said side walls and adapted to laterally distribute fuel passing through said upper passage, whereby material flowing through said passages intermixes and burns substantially immediately beyond said forward ends of said passages with a relatively short and laterally uniform flame.

4. A burner for a furnace heated by the combustion of pulverized fuel, comprising in combination, walls forming an entrance section and a distributing section in longitudinal registry with each other, a substantially horizontal partition dividing said entrance and distributing sections into upper and lower passages respectively, a Venturi-like constriction in said upper passage of said entrance section, means forming a fuel inlet opening into said upper passage adjacent said constriction, said upper and lower passages being many times wider than the depth thereof, said passages further having means for admitting air thereto under pressure and adapted respectively to have a mixture of fuel and air and air moving therethrough to effect complete combustion immediately adjacent the forward ends of said passages, said distributing section having its side walls flaring toward said forward end and its top wall and bottom wall converging toward said forward end, said top wall being downwardly bowed transversely between said side walls and adapted to laterally distribute fuel passing through said upper passage, whereby fuel is adapted to be aspirated into and moved through said upper passage and material flowing through said passages intermixes and is adapted to be burned substantially immediately beyond said forward ends of said passages with a relatively short and laterally uniform flame.

5. A burner for a furnace heated by the combustion of pulverized fuel, comprising in combination, walls forming an entrance section, a distributing section and a mixing section each in successive longitudinal registry with the other, a horizontal partition substantially entirely dividing said entrance and distributing sections into upper and lower passages respectively, means for admitting air under pressure to the outer ends of said passages, a Venturi-like constriction in said upper passage of said entrance section, means forming a fuel inlet opening into said upper passage adjacent said constriction, a baffle in said upper passage positioned forwardly of said fuel inlet and adapted to laterally distribute a stream of fuel entering through said fuel inlet, said distributing section having its side walls flaring toward its forward end and its top and bottom walls converging toward its forward end to make said passages of generally laterally elongated and rectangular shape at that location, said top wall being downwardly bowed transversely between said side walls and adapted to laterally distribute said stream of fuel passing through said upper passage, said mixing section having a top wall bowing downwardly and transversely in substantial registry with said top wall of said distributing section, whereby upon air being admitted to the outer ends of said passages, said stream of fuel is moved along said upper passage and intermixed with air from said lower passage immediately adjacent said mixing section for substantially complete short-flame combustion.

6. A burner for a furnace heated by the combustion of pulverized coal preferably of 200 mesh screen size or smaller, said coal being pulverized in a pulverizer employing steam as a motive fluid, comprising in combination, walls defining an entrance section, a distributing section and a mixing section each in successive longitudinal registry with the other, a horizontal partition substantially entirely dividing said entrance and distributing sections into upper and lower passages respectively, means for admitting air under pressure to said passages in said entrance section, a Venturi-like constriction in said upper passage of said entrance section, means forming a fuel inlet opening downwardly into said upper passage adjacent said constriction, a baffle in said upper passage positioned and flaring forwardly of said fuel inlet and adapted to break up any agglomerated particles of fuel and to laterally distribute said fuel entering through said fuel inlet, said distributing section having its side walls flaring toward its forward end and its top and bottom walls respectively converging toward its forward end to form discharge ends for said passages having a width many times greater than the depth thereof, said discharge ends being in superposed juxtaposition, said top wall being downwardly bowed transversely between said side walls and adapted to further laterally distribute said stream of fuel passing through said upper passage, said mixing section having its top wall bowing downwardly and transversely in substantial registry with said top wall of said distributing section, whereby fuel and air are adapted to be passed through said passages and intermixed and burned with a relatively short intense flame of laterally uniform character immediately adjacent the forward end of said mixing section.

WILLIAM A. THOMAS.

REFERENCES CITED

The following references are of record in the file of this patent:

UNITED STATES PATENTS

| Number | Name | Date |
|---|---|---|
| 616,455 | Day | Dec. 27, 1898 |
| 888,787 | Crosby | May 26, 1908 |
| 1,265,172 | Caracristi et al. | May 7, 1918 |
| 1,535,903 | Collins | Apr. 28, 1925 |
| 1,566,177 | Whitaker | Dec. 15, 1925 |
| 1,834,768 | Chapple | Dec. 1, 1931 |
| 1,914,828 | Hardinge | June 28, 1933 |
| 1,961,043 | Hatch | May 29, 1934 |
| 2,053,340 | Kennedy | Sept. 8, 1936 |

Certificate of Correction

Patent No. 2,494,070 January 10, 1950

WILLIAM A. THOMAS

It is hereby certified that errors appear in the printed specification of the above numbered patent requiring correction as follows:

Column 2, line 25, after the word and semicolon "section;" insert *and*; column 3, line 30, strike out "end";

and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*